(12) United States Patent
Gomes et al.

(10) Patent No.: US 6,687,904 B1
(45) Date of Patent: Feb. 3, 2004

(54) METHOD AND APPARATUS FOR SELECTING A LOCKING POLICY BASED ON A PER-OBJECT LOCKING HISTORY

(75) Inventors: Benedict A. Gomes, Cupertino, CA (US); Boris Weissman, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/444,552

(22) Filed: Nov. 22, 1999

(51) Int. Cl.[7] .................................................. G06F 9/00
(52) U.S. Cl. ...................... 718/102; 718/100; 719/315; 719/316
(58) Field of Search ................................. 709/100, 101, 709/102, 103, 104, 107, 108; 718/100, 102, 103, 104, 105, 106, 107, 168; 719/315, 316

(56) References Cited

PUBLICATIONS

Craig, Travis S. Binding FIFO and Priority–Queuing Spin Locks from Atomic Swap. Department of Computer Science and Engineering, University of Washington. Technical Report 93–02–02.*

Tay, Y.C, Goodman Nathan, Suri Rajan. Locking Performance in Centralized Databases. ACM Transactions on Database Systems vol. 10, No. 4, Dec. 1985.*

* cited by examiner

*Primary Examiner*—Majid A. Banankhah
(74) *Attorney, Agent, or Firm*—Beyer Weaver & Thomas, LLP

(57) ABSTRACT

Methods and apparatus for locking an object using an efficient combination spinning and blocking process are disclosed. According to one aspect of the present invention, a method for acquiring ownership of an object in an object-based environment using a current thread includes determining when the object is owned by another thread, and locking the object when it is determined that the object is not owned by the another thread. A first spinning process, which is implemented when it is determined that the object is owned by the another thread, is arranged such that the current thread spins for up to a predetermined number of spin cycles associated with the current thread and the object. The predetermined number of spin cycles is determined using historical information, and is not based upon an overall system specification. When it is determined that the object has not been locked by the current thread during the first spinning process, a first blocking process is implemented.

20 Claims, 7 Drawing Sheets

METHOD AND APPARATUS FOR SELECTING A LOCKING POLICY BASED ON A PER-OBJECT LOCKING HISTORY

BACKGROUND OF THE INVENTION

1. Field of Invention

The present invention relates generally to methods and apparatus for improving the performance of software applications. More particularly, the present invention relates to methods and apparatus for reducing the overhead associated with obtaining a lock on an object.

2. Description of the Related Art

In object-based computing systems, objects are generally operated on by threads. An object typically includes a set of operations and a state that remembers the effect of the operations. Since an object has some memory capability, an object differs from a function, which has substantially no memory capability. A thread, as will be understood by those skilled in the art, may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside.

During the execution of an object-based program, multiple threads may attempt to execute operations which involve a single object. In other words, more than one thread may attempt to operate on a single object. Frequently, only one thread is allowed to invoke one of some number of operations, i.e., synchronized operations, that involve a particular object at any given time. A synchronized operation, e.g., a synchronized method, is block-structured in that it requires that the thread invoking the method first synchronize with the object that the method is invoked on, and desynchronize with that object when the method returns. Synchronizing a thread with an object generally entails controlling access to the object using a synchronization construct before invoking the method.

Since a thread, e.g., a concurrent thread as will be appreciated by those skilled in the art, is not able to predict when it will be forced to relinquish control, synchronization constructs such as locks, mutexes, semaphores, and monitors may be used to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object.

FIG. 1 is a diagrammatic representation of an object which is provided with a lock and two threads that both require access to the object. An object 102 includes a header field 106 and a word 110 which is arranged to indicate if object 102 is locked, or owned by a thread 114. As shown, object 102 is locked by thread 114a. Accordingly, word 110 identifies thread 114a as owning object 102. Another word 118 is stored in a stack frame 122, e.g., stack frame 122a, of a stack 126a that is associated with thread 114a. Word 118 is arranged to indicate that thread 114a has possession of the lock on object 102 and is, therefore, allowed to operate on object 102.

When thread 114b, which has an associated stack 126b, requires access to object 102, thread 114b reads word 110 and determines whether object 102 is available. When object 102 is locked by thread 114a, thread 114b may not obtain the lock on object 102 until thread 114a has relinquished the lock. In other words, until word 110 indicates that no thread owns object 102, thread 114b may not obtain the lock on object 102.

In general, thread 114b may either repeatedly attempt to lock object 102, or thread 114b may effectively "sleep" until it is notified that object 102 is available. With reference to FIG. 2, the steps associated with the acquisition of an object lock by a thread will be described. A process 202 of acquiring an object lock begins at step 204 in which a thread, e.g., thread 114b of FIG. 1, attempts to lock an object, e.g., object 102 of FIG. 1. In attempting to lock an object or, more generally, in attempting to acquire the ownership of an object, the thread may study the object to determine if the object is locked. By way of example, as discussed above with respect to FIG. 1, the thread may read a specific word stored in the object to determine if the object is available to the thread. When the object is available, the thread may update the specific word to indicate that it has locked, or acquired ownership of, the object.

A determination is made in step 208 as to whether the attempt by the thread to lock the object was successful. If the determination is that the attempt was successful, then the thread has the object lock, and the process of locking the object is completed. Alternatively, when it is determined that the attempt to lock the object was not successful, the indication is that the object is locked by another thread. As such, the thread typically must wait for the other thread to relinquish the object lock before the thread may lock the object.

When the attempt to lock the object was not successful, then process flow proceeds to step 212 where it is determined if the thread is coded to spin or to block when awaiting the availability of the object. When a thread is coded to spin, the thread will periodically check the object to determine if the lock on the object is available. Spinning, or busy-waiting for a resource such as an object to be freed, avoids thread context switches, as will be appreciated by those skilled in the art. Alternatively, when a thread is coded to block, the thread effectively puts itself into a sleep state during which the thread does not attempt to access the object.

If the determination in step 212 is that the thread is coded to spin, then the thread spins for a given period of time in step 216. The given period of time is typically specified by the overall computing system, and is considered to be one "spin cycle." After the thread spins for one spin cycle, process flow returns to step 204 where the thread once again attempts to lock the object.

Alternatively, when it is determined in step 212 that the thread is coded to block, the thread blocks itself in step 220. As will be appreciated by those skilled in the art, computing systems generally specify a maximum number of spin cycles. In some systems, when a thread has spun for the maximum number of spin cycles without successfully locking an object, the thread may then block itself. That is, in some systems, a thread may be coded to first spin, then eventually block if the object lock has not been successfully obtained through spinning.

While the thread is blocked, the thread awaits notification, typically from an operating system, that the object is available for locking. In step 224, the thread receives notification that the object is available for locking. Accordingly, the thread unblocks itself and process flow returns to step 204 in which the thread once again attempts to lock the object.

Blocking a thread, or putting a thread to sleep such that the thread is effectively not executing, while waiting for an object to be freed is computationally less expensive than allowing a thread to spin if it is expected to take a significant amount of time for the object to become free. However, since blocking a thread typically requires context switches, if an object is expected to be freed in a relatively short amount of time, then allowing the thread to spin may be more efficient from a performance point of view. As will be understood by those skilled in the art, a context switch entails allowing another thread to execute on a particular central processing unit (CPU) if another thread is available. In general, the choice of whether to block a thread or to allow the thread to spin is made on a system-wide basis. That is, either all threads in a system block, or all threads in the system spin.

Since not all threads and objects in a system are typically characterized by the same behavior, e.g., not all threads benefit from spinning, having all threads either block or spin is likely to be inefficient. By way of example, in a system where all threads spin, a particular thread may continue spinning for a significant amount of time. For such a thread, continually spinning may be inefficient, as blocking such a thread would allow system resources to be better allocated for other purposes.

To prevent threads from spinning continually while failing to acquire ownership of an object, some systems allow a thread to spin only for up to a maximum number of spins, at which point the thread is blocked. For such a system in which a thread is allowed to spin for a maximum number of times specified within a system and then block, spinning may still be inefficient when the thread is eventually forced to block. That is, allowing a thread which eventually blocks itself to first spin repeatedly is effectively a waste of system resources. The repeated attempts to lock an object during an overall spinning process often proves to be expensive, and have the tendency to adversely affect program performance by utilizing system resources which may be used elsewhere.

Therefore, what is desired is a method for reducing the cost associated with attempts to lock an object. That is, what is needed is a method for efficiently determining when a thread should spin and when a thread should block while awaiting the availability of an object.

SUMMARY OF THE INVENTION

The present invention relates to a method for enabling a thread to spin for a substantially optimal period of time while attempting to acquire an object lock before allowing the thread to enter a blocking state. According to one aspect of the present invention, a method for acquiring ownership of an object in an object-based environment using a current thread includes determining when the object is owned by another thread, and locking the object when it is determined that the object is not owned by the another thread. A first spinning process, which is implemented when it is determined that the object is owned by the another thread, is arranged such that the current thread spins for up to a predetermined number of spin cycles associated with the current thread and the object. The predetermined number of spin cycles is determined using historical information, and is not based upon an overall system specification. When it is determined that the object has not been locked by the current thread during the first spinning process, a first blocking process is implemented. Allowing a thread to spin for a predetermined amount of times then block, if necessary, enables resources allocated for locking to be efficiently used, thereby improving the performance of the overall system.

In one embodiment, it is determined if the current thread is in an information gathering position. The first spinning process is implemented when it is determined that the object is owned by another thread and the current thread is not in the information gathering position. In such an embodiment, when it is determined that the current thread is in the information gathering position, a second spinning process is implemented. During the second spinning process, the current thread spins for up to a maximum number of spin cycles that is specified by the object-based environment. After the second spinning process, historical information associated with the second spinning process is stored.

According to another aspect of the present invention, an object-based computing environment includes at least one processor and a first thread that has possession of a locking mechanism associated with an object. The computing environment also includes a current thread. The current thread is arranged to determine when the locking mechanism is possessed by the first thread, and is also arranged to implement a first spinning process when it is determined that the locking mechanism is possessed by the first thread. The first spinning process is arranged such that the current thread spins for up to a predetermined number of spin cycles that is determined using historical information associated with the current thread and the object, the predetermined number of spin cycles being determined using historical information.

In accordance with still another aspect of the present invention, a method for acquiring ownership of an object in an object-based system includes obtaining historical spinning information. The historical spinning information includes data associated with a number of times a current thread has previously spun while attempting to acquire ownership of the object. The method also includes reducing the historical spinning information to determine a suitable number of spin cycles, and spinning the current thread for up to the suitable number of spin cycles. Between spin cycles, the current thread attempts to acquire ownership of the object. Finally, the method includes determining when the current thread has acquired ownership of the object blocking the current thread when it is determined that the current thread has not acquired ownership of the object. In one embodiment, the suitable number of spin cycles is indicative of a substantially maximum amount the current thread spins to achieve a predetermined level of probability that the current thread acquires ownership of the object during spinning.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
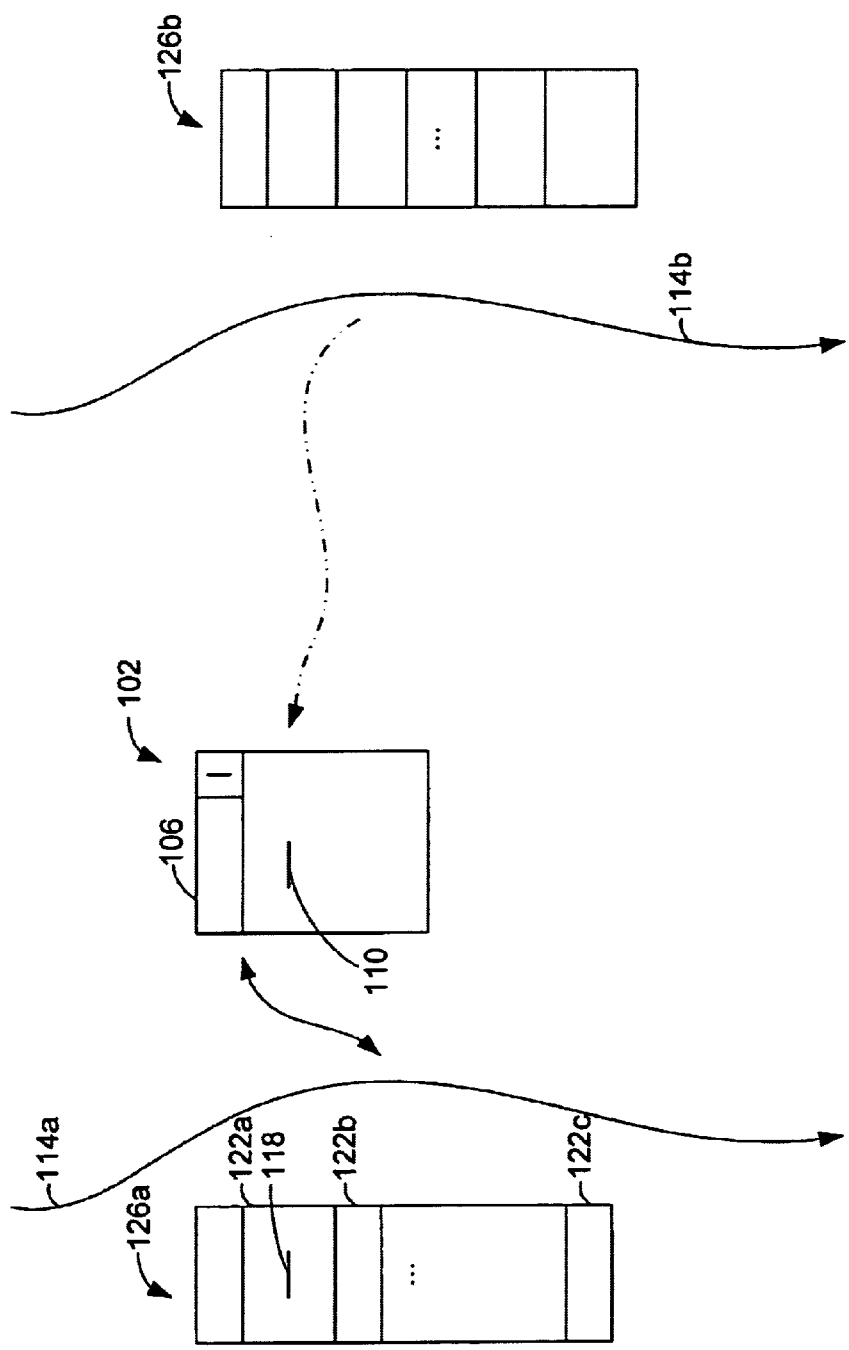
FIG. 1 is a diagrammatic representation of an object whose ownership is being contended.
Figure 2:
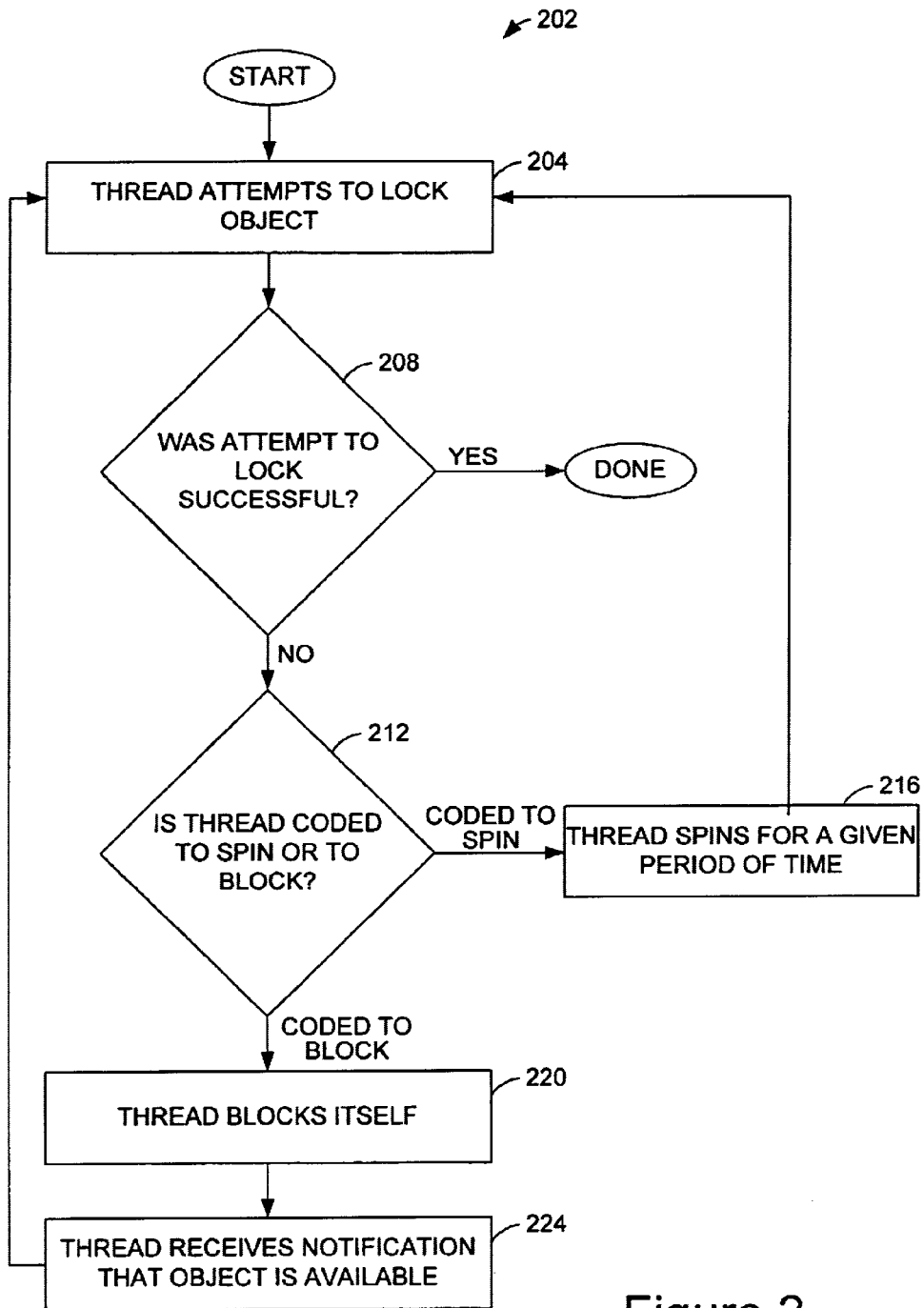
FIG. 2 is a process flow diagram which illustrates a conventional method of locking an object.

In a computing system such as a multi-threaded, object-based system, objects may often be in contention. In other words, one thread may likely attempt to gain access to an object which is locked by another thread. When an object is owned, e.g., when the lock on a object is held, by one thread, that thread is effectively the only thread which is allowed to operate on the object. In other words, only the owner thread, or the thread which holds the lock to an object, may operate on the object. Accordingly, a different thread which is attempting to acquire the lock on the object is unable to do so until the owner thread relinquishes the lock.

While awaiting the availability of an object it wishes to lock, a thread may either block itself or spin, i.e., busy-wait. The choice of whether to block a thread or to allow the thread to spin is often made on a system-wide basis such that either all threads in a system block, or all threads in the system spin. As will be appreciated by those skilled in the art, generally, not all threads and objects in a system are characterized by the same behavior. For example, some objects have locks that have small critical sections, where spinning may be a benefit, while other objects have locks which are more efficiently obtained through blocking. Therefore, having all threads either block or spin is typically inefficient.

To prevent threads from spinning continually while failing to acquire ownership of an object, some systems allow a thread to spin only for up to a maximum number of spins specified by the systems, at which point the thread is blocked. Although such systems may often be more efficient than systems in which threads either only spin or only block, spinning may still be inefficient when the thread is eventually forced to block. In other words, when a thread which eventually blocks itself spins repeatedly prior to blocking, valuable system resources may be wasted, thereby compromising the overall performance of the system.

By allowing different threads to spin for different amounts of time prior to blocking, the overhead associated with locking an object, or, more specifically, attempting to lock an object, may be reduced. The history associated with attempts by a thread or threads to lock an object may be used to compute an effectively "optimal" number of times the thread or threads are allowed to spin when attempting to lock the object. Hence, rather than having all threads spin for a number of times specified by an overall system before blocking, each thread may spin for a number of times, as determined from historical data, that is specific to each particular object.

The optimal number of times a thread is allowed to spin may generally be associated with an amount of time during which the thread generally is expected to able to acquire an object lock. In other words, once a thread has spun for an optimal number of times specified with respect to an object, the thread typically has successfully locked the object it was attempting to lock. The optimal number of times a thread spins may be determined using substantially any suitable criteria. For instance, the optimal number of times may be based on a probability of obtaining a lock, e.g., a number of times the thread typically spins before the likelihood that it has obtained the object lock is approximately ninety percent. Alternatively, the optimal number of times may be chosen based upon a trade-off between the overhead associated with blocking and the overhead associated with spinning. As such, for some objects, an optimal number of times threads spin while attempting to lock the objects may be zero.

As previously mentioned, during an object-locking process, once the optimal number of times, or spins, associated with a thread is exceeded, that thread may then block itself. In one embodiment, a given thread will often have acquired a targeted object lock before the optimal number of times is exceeded. Therefore, it is likely that the thread will not have to block itself except in rare cases. In another embodiment, such as one in which blocking is determined to be more efficient than repetitive spinning for a particular thread, the optimal number of times may be low, thereby causing the thread to substantially always block itself.

Figure 3:
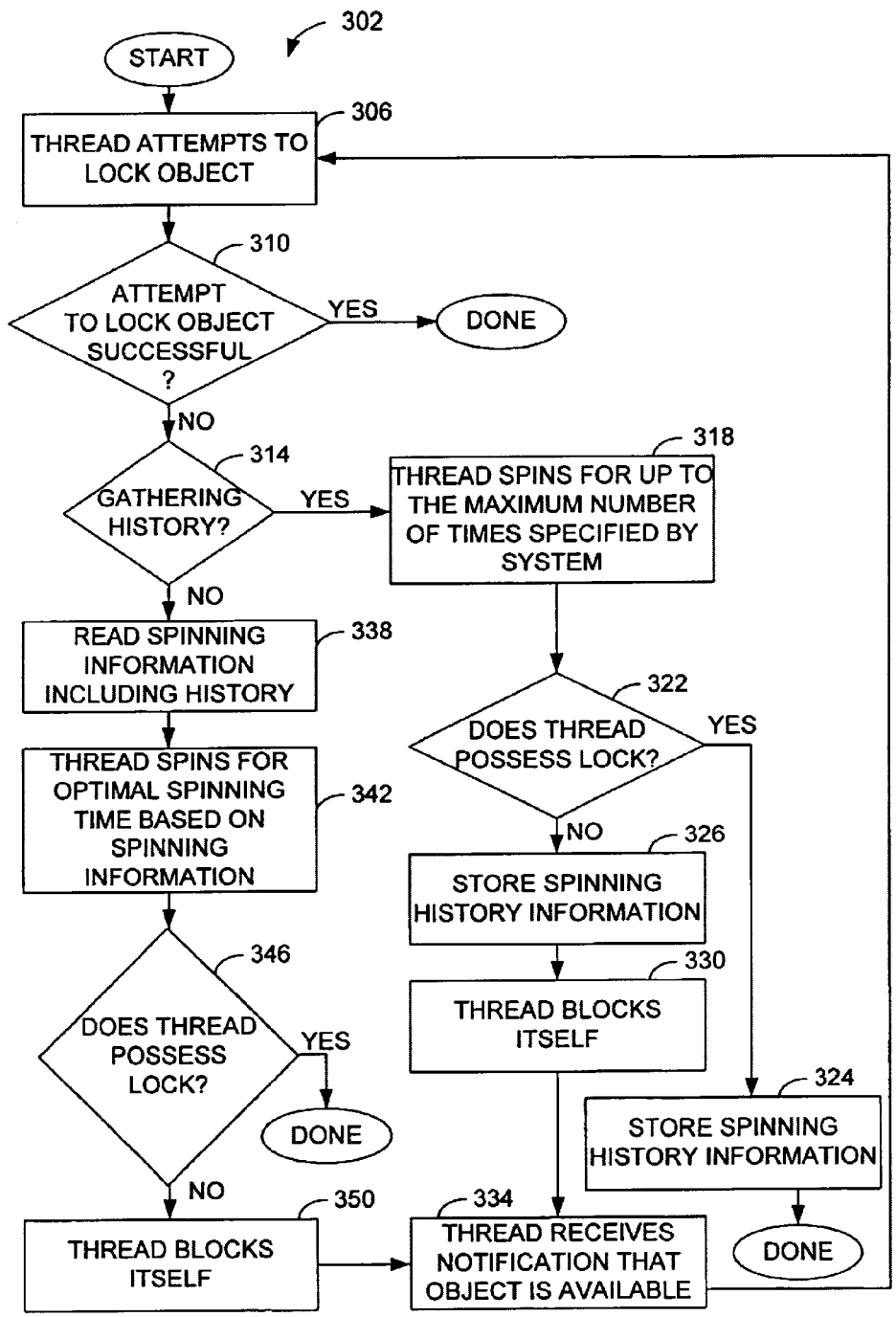
FIG. 3 is a process flow diagram which illustrates a process of locking an object in accordance with an embodiment of the present invention.

With reference to FIG. 3, one method of locking an object will be described in accordance with an embodiment of the present invention. A process 302 of locking an object begins at step 306 in which a thread, e.g., a "current" thread, attempts to lock an object. Typically, attempting to lock an object may include obtaining bits from the object which identify whether the object is owned or unowned, i.e., locked or unlocked. If the bits indicate that the object is owned, then the current thread is unable to lock the object. If the bits indicate that the object is unowned, then in the described embodiment, the current thread locks the object. It should be appreciated that substantially any suitable method may be used by the current thread to lock the object.

A determination is made in step 310 as to whether the attempt by the current thread to lock the object was successful. If the attempt is determined to be successful, then the indication is that the current thread has ownership of the object. Hence, the process of locking the object is completed. Alternatively, if the determination is that the attempt to lock the object was not successful, then process flow moves to step 314 where it is determined if the overall system is in a history gathering stage, e.g., with respect to the object. That is, a determination is made regarding whether additional historical information relating to the object and the current thread is needed.

When the determination in step 314 is that additional historical information is desired, process control proceeds to step 318 in which the current thread spins for up to the maximum number of times, or cycles, specified by the overall system. In general, each system has a preferred number of times each thread is allowed to spin before switching to a block mode, if the object is not acquired by the thread during the period of time the thread is spinning. This preferred number of times is typically the same for all threads in a system which are attempting to acquire ownership of an object. One process of allowing a thread to spin will be described below with respect to FIG. 4a.

While the overall spinning process is in progress, after each "spin cycle," the current thread may attempt to acquire the lock for the object. It should be understood that if the object is locked by the current thread during the overall spinning process, the spinning process is typically terminated. That is, once the current thread locks the object, the spinning process is considered to be completed.

After the current thread spins for up to the maximum number of times specified by the overall system, a determination is made in step 322 as to whether the current thread has acquired the object lock. If the current thread has acquired the object lock, information relating to the number of spin cycles the current thread made before acquiring the object lock is stored in step 324. In other words, spinning history information is stored such that it may be subsequently be used to determine an optimal number of spins during which the object lock is likely to be acquired, as will be discussed below. Once the spinning information is stored, as for example in the object, the process of locking an object is completed.

In the described embodiment, historical information is gathered such that each time an attempt is made to lock an object during an information gathering stage, that information is stored. That is, the information stored is associated with an object, and not any particular thread. Therefore, all information gathered and stored during the information gathering stage effectively reflects the number of times different threads, which attempt to lock the object, have spun. It should be understood, however, that in alternate embodiments, historical information may be gathered on a per-object and per-thread basis. In other words, historical information relating to attempts by each thread in a system to lock the object may be stored separately.

Returning to step 322, if the current thread has not acquired the object lock, the process flow moves from step 322 to step 324 in which spinning information is stored. Since the current thread has not acquired the lock, the spinning information that is stored generally reflects the maximum number of spins specified by the overall system. After the spinning information is stored, the current thread blocks itself in step 330 and awaits notification that the object is available for locking. The current thread receives notification that the object is available in step 334, and unblocks itself. Upon receiving notification that the object is available, the current thread then attempts to lock the object in step 306. As will be appreciated by those skilled in the art, the current thread will typically be unsuccessful in locking the object in the event that another thread attempts to lock the object between the time the current thread receives notification and the time that the current thread begins its attempt to lock the object.

Returning to step 314, when it is determined that the system is not in a history gathering stage with respect to the object, spinning information is read from the object in step 338. In one embodiment, the spinning information includes historical spinning information obtained during a history gathering process. Once the spinning information is read, the current thread spins for an optimal spinning time, e.g., an optimal number of spin cycles, in step 342 that is determined based upon the spinning information. It should be appreciated that substantially any suitable method may be used to reduce the spinning information such that an optimal spinning time may be determined. Suitable methods include, but are not limited to, various probabilistic and statistical algorithms. One method of spinning the current thread for an optimal spinning time will be described below with reference to FIG. 4b.

While the current thread spins, e.g., between consecutive spin cycles, the current thread attempts to obtain the object lock. After the spinning process is completed, a determination is made in step 346 regarding whether the current thread possesses the object lock. When the determination is that the current thread has possession of the object lock, the process of locking an object is completed.

Alternatively, when it is determined in step 346 that the current thread does not possess the object lock, then process flow moves to step 350 in which the current thread blocks itself, or otherwise "sleeps." The current thread generally sleeps until notification is received, as for example from the overall operating system, that the object is available. When the current thread receives notification that the object is available in step 334, process flow returns to step 306 where the current thread once again attempts to lock the object.

Figure 4A:
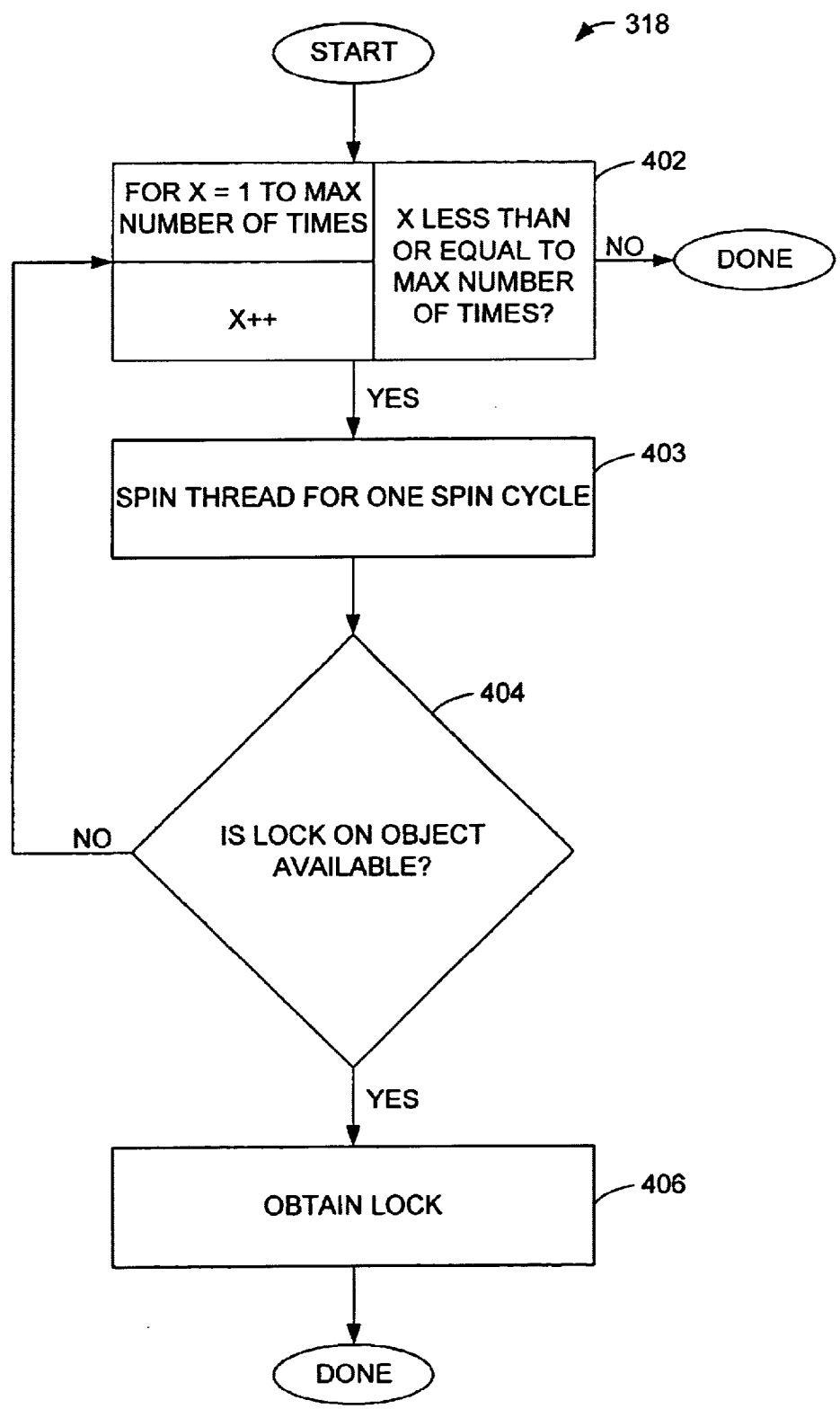
FIG. 4a is a process flow diagram which illustrates a process spinning a thread for up to a maximum number of times, i.e., step 318 of FIG. 3, in accordance with an embodiment of the present invention.

As mentioned above, during a history gathering process, a thread that is trying to lock an object spins for up to a maximum number of times specified by an overall system. FIG. 4a is a process flow diagram which illustrates a process spinning a thread for up to a maximum number of times, i.e., step 318 of FIG. 3, in accordance with an embodiment of the present invention. A process 318 for spinning a thread begins at step 402 where it is determined if the maximum number of times, or spins, has been exceeded. If the maximum number of spins has been exceeded, then the spinning process is completed. On the other hand, if the maximum number of spins has not been exceeded, then the thread spins once, or undergoes one spin cycle, in step 403.

After the spin cycle is completed, it is determined in step 404 whether the lock on the object that the thread is trying to lock is available. If the lock is not available, then process flow returns to step 402 where it is determined if the maximum number of spins has been exceeded. Alternatively, if the lock on the object is available, then the thread obtains the lock in step 406, and the spinning process is completed.

Figure 4B:
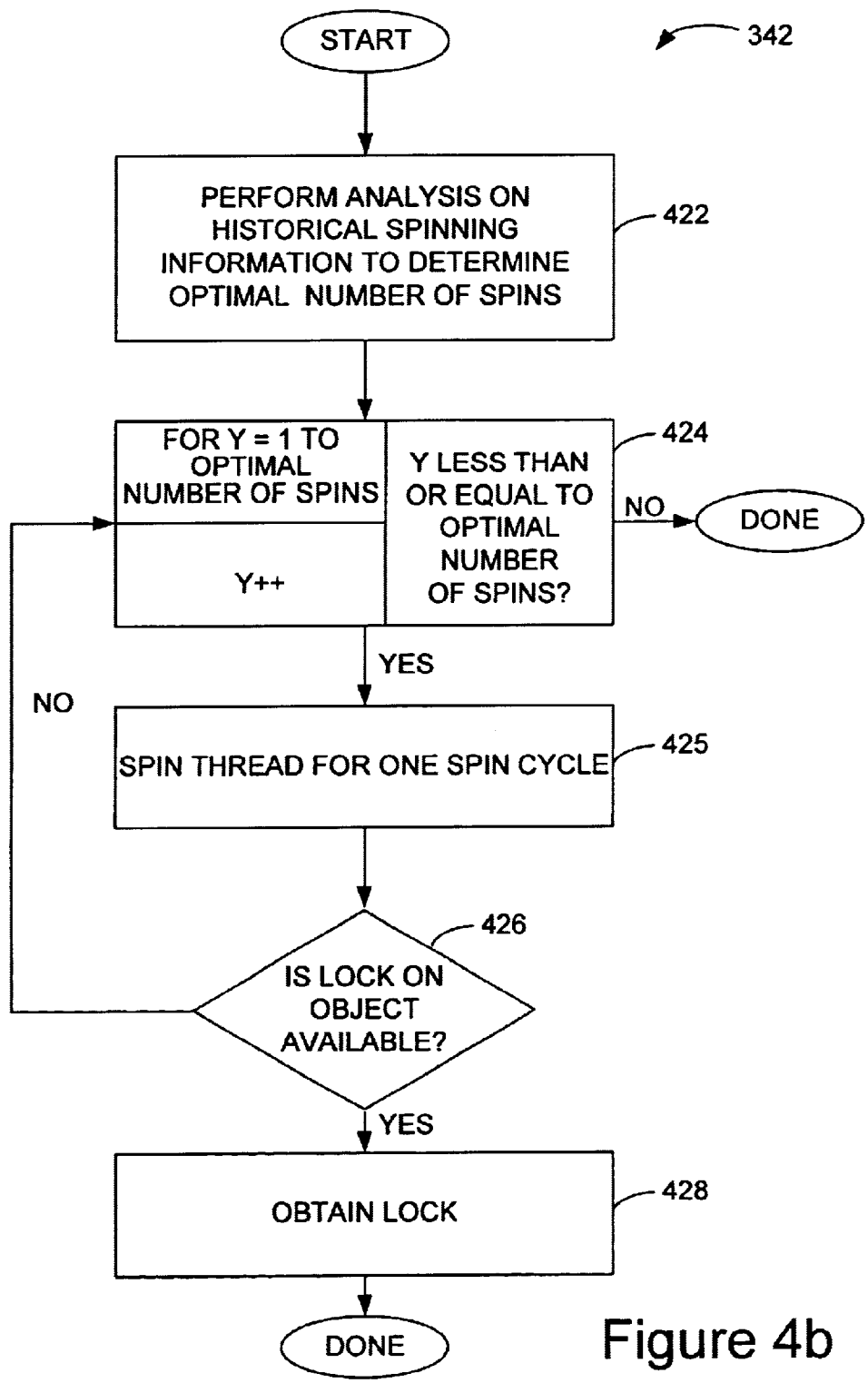
FIG. 4b is a process flow diagram which illustrates a process spinning a thread for up to an optimal maximum number of times, i.e., step 342 of FIG. 3, in accordance with an embodiment of the present invention.

In the described embodiment, in addition to spinning during a history gathering process, a thread also spins after the history gathering process is completed. Specifically, as discussed above with reference to FIG. 3, a thread spins for an optimal spinning time once the history gathering process has ended. FIG. 4b is a process flow diagram which illustrates a process spinning a thread for up to an optimal maximum number of times, i.e., step 342 of FIG. 3, in accordance with an embodiment of the present invention. A process 342 of spinning a thread begins at step 422 in which historical spinning information is analyzed to determine an optimal number of spins, or a spinning time during which ownership of an object is typically obtained by the thread. In general, any suitable mathematical algorithm or data reduction scheme may be used to determine an optimal number of spins.

In step 424, once the optimal number of spins is calculated, it is determined if the optimal number of spins has been exceeded. When the optimal number of spins has been exceeded, then the spinning process is considered as being completed. Alternatively, when the optimal number of spins has not been exceeded, then the thread spins once, or undergoes one spin cycle, in step 425. As will be appreciated by those skilled in the art, unless the optimal number of spins is zero, the thread will spin at least once, i.e., step 425 will be executed at least once.

Upon completion of the spin cycle, it is determined in step 426 whether the lock on the object to be locked is available. If the lock is not available, then process flow returns to step 422 where it is determined if the optimal number of spins has been exceeded. Alternatively, if the lock on the object is available, then the thread obtains the lock in step 428, and the spinning process is completed.

Figure 5:
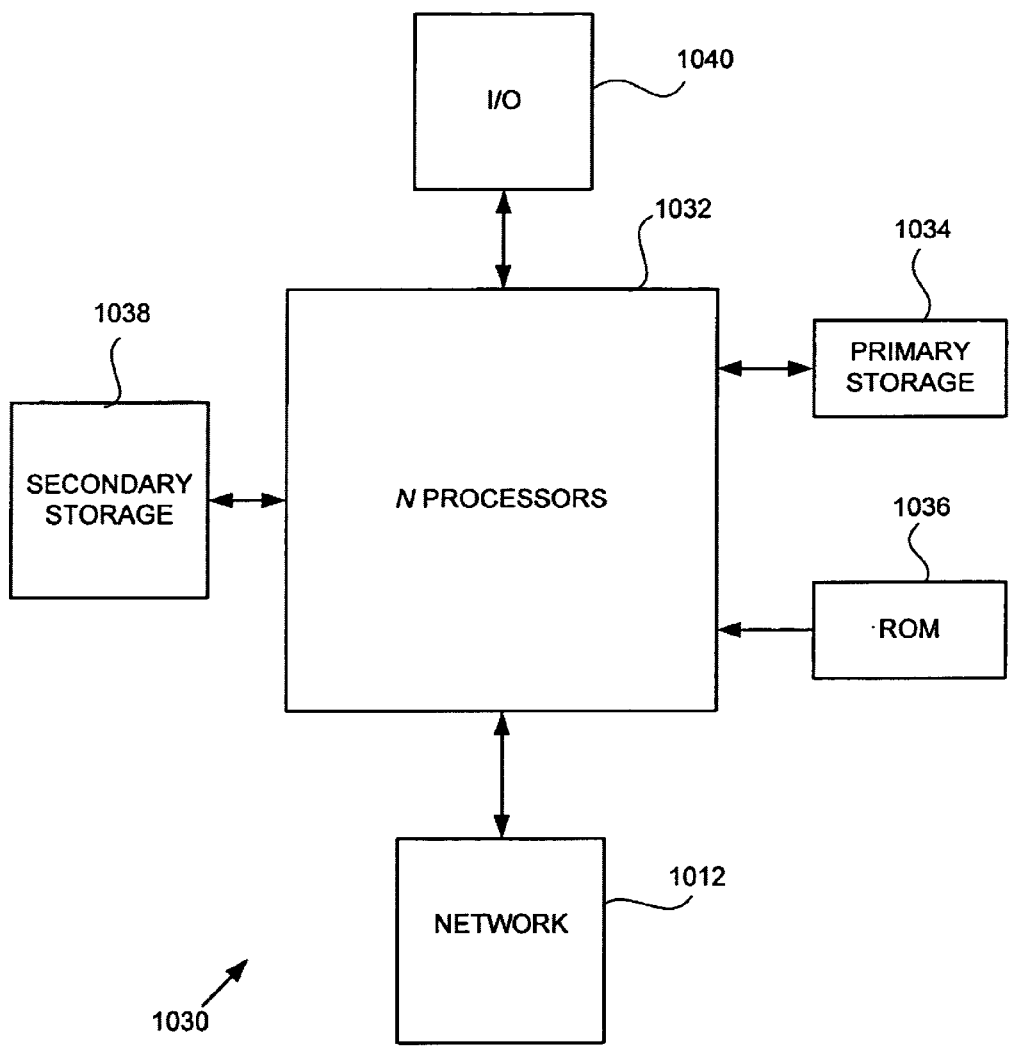
FIG. 5 is a diagrammatic representation of a general purpose computer system suitable for implementing the present invention.

FIG. 5 illustrates a typical, general purpose computer system suitable for implementing the present invention. The computer system 1030 includes any number of processors 1032 (also referred to as central processing units, or CPUs)

that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 6. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 6:
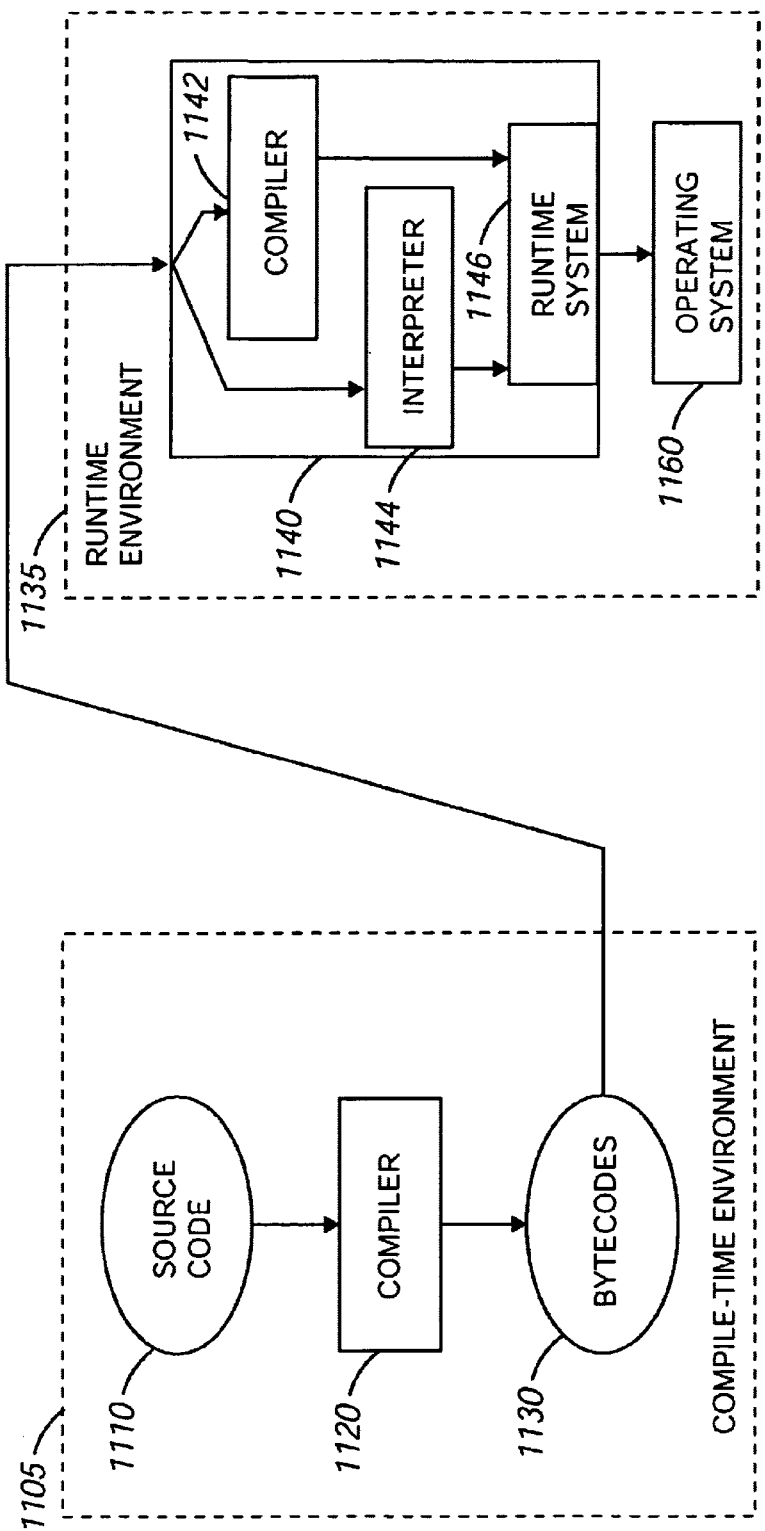
FIG. 6 is a diagrammatic representation of a virtual machine that is supported by the computer system of FIG. 5, and is suitable for implementing the present invention.

As previously mentioned, a virtual machine may execute on computer system 1030. FIG. 6 is a diagrammatic representation of a virtual machine which is supported by computer system 1030 of FIG. 8, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 5, or stored on a storage device such as primary storage 1034 of FIG. 5. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 5. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps associated with methods associated with gathering historical information associated with locking an object or, more generally, steps associated with awaiting the availability of an object lock may be reordered, removed or added depending upon the requirements of a particular system. For instance, spinning information may be stored before a determination of when a current thread possesses an object lock instead of after such a determination.

As will be appreciated by those skilled in the art, an object lock is an example of a synchronization construct. In general, a synchronization construct is arranged to prevent more than one thread from operating on an object at any given time. While the present invention has been described as being associated with obtaining a lock on an object, rather than obtaining a lock, any suitable synchronization construct may instead be used to gain effective ownership of an object. Suitable synchronization constructs may include, but are not limited to, semaphores, monitors, and mutexes.

An optimal spinning time, as described, is based on an object and is applicable to all threads that attempt to lock the object. However, in one embodiment, each thread may have its own optimal spinning time with respect to the object. In other words, an optimal spinning time may be determined on a per-object and per-thread basis such that each object-thread pairing in an overall system has its own optimal spinning time without departing from the spirit or the scope of the present invention.

Determining an optimal number of spins using historical spinning information has been described as being a part of a process of enabling a thread to spin. In other words, the optimal spinning time is calculated when a thread is about to begin spinning. It should be appreciated, however, that the optimal number of spins may be determined at substantially any suitable time. By way of example, the optimal number of spins may be updated or otherwise determined dynamically each time spinning information is stored. When the optimal number of spins is updated dynamically, the optimal number of spins may be stored within the object such that when spinning information is read, the optimal number of spins is automatically obtained.

Alternatively, in one embodiment, an optimal number of spins may be computed substantially only once, e.g., immediately after a history gathering process for an object is completed. In such an embodiment, the optimal number of spins may be stored once it is calculated, such that it is easily accessed by threads which obtain spinning information associated with the object.

As mentioned above with respect to FIG. 4b, the optimal number of times a thread may spin before blocking may be zero. If the optimal number of spins is zero, then the indication may be that after the maximum number of spins specified by an overall system has been exceeded, the thread still has not locked the object it wishes to lock. Hence, the optimal number of spins may be zero if the trade-off between spinning and context switches associated with blocking is such that it is advantageous to block the thread without spinning. Making a determination to only block a thread may involve calculating, as a part of a locking process, whether spinning or blocking is more efficient.

While spinning information has been described as being stored in an object using, for example, otherwise unused bits in the object, spinning information may generally be stored anywhere within an overall system. For example, spinning information for a plurality of objects may be stored in a data structure which is accessible to the plurality of objects and to threads which are attempting to acquire ownership to the objects.

Although historical spinning information used to determine an optimal number of spin cycles a thread undergoes before blocking has been described as being associated with a particular object, it should be appreciated that in one embodiment, the optimal number of spin cycles may instead be associated with substantially only the thread. That is, rather than gathering historical data on a per object basis such that each thread that is attempting to lock the object has an optimal number of spin cycles specified by the object, historical data for all objects a thread has attempted to lock may be used to determine a single optimal number of spin cycles for the thread. Hence, a thread may have substantially only one optimal number of spin cycles associated therewith.

In general, historical spinning information has been described as being suitable for use in determining an optimal number of spin cycles, it should be understood that historical spinning information may be used for other purposes as well. Such purposes include, but are not limited to, determining whether a lock would benefit from being deflated during a normal deflation period, determining whether an attempt should be made to eagerly deflate a lock, and determining whether the nature of the lock implementation would benefit from being changed during a garbage collection process without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for acquiring ownership of an object in an object-based environment using a current thread, the computer-implemented method comprising:

determining when the object is owned by another thread;

locking the object when it is determined that the object is not owned by the another thread;

implementing a first spinning process when it is determined that the object is owned by the another thread, the first spinning process being arranged such that the current thread spins for up to a predetermined number of spin cycles associated with the current thread and the object, the predetermined number of spin cycles being determined using historical information;

determining when the object has been locked by the current thread during the first spinning process; and implementing a first blocking process when it is determined that the object has not been locked by the current thread during the first spinning process, wherein during the first blocking process, the current thread awaits notification that the object is available for locking.

2. A computer-implemented method as recited in claim 1 further including determining when the current thread is in an information gathering position, wherein the first spinning process is implemented when it is determined that the object is owned by the another thread and the current thread is not in the information gathering position.

3. A computer-implemented method for acquiring ownership of an object in an object-based environment using a current thread, the computer-implemented method comprising:

determining when the object is owned by another thread;

locking the object when it is determined that the object is not owned by the another thread;

determining when the current thread is in an information gathering position when it is determined that the object is owned by the another thread;

implementing a first spinning process when it is determined that the object is owned by the another thread and the current thread is not in the information gathering position, the first spinning process being arranged such that the current thread spins for up to a predetermined number of spin cycles associated with the current thread and the object, the predetermined number of spin cycles being determined using historical information;

determining when the object has been locked by the current thread during the first spinning process; and implementing a first blocking process when it is determined that the object has not been locked by the current thread during the first spinning process, wherein during the first blocking process, the current thread awaits notification that the object is available for locking; and wherein when it is determined that the current thread is in the information gathering position, the method further includes, implementing a second spinning process, the second spinning process being arranged such that the current thread spins for up to a maximum number of spin cycles, the maximum number of spin cycles being specified by the object-based environment; and storing information associated with the second spinning process.

4. A computer-implemented method as recited in claim 3 further including:

determining when the object has been locked by the current thread during the second spinning process; and implementing a second blocking process when it is determined that the object has not been locked by the current thread during the second spinning process.

5. A computer-implemented method as recited in claim 3 wherein the information is the historical information, and storing the information associated with the second spinning process includes storing data associated with a number of spin cycles that occurred during the second spinning process.

6. A computer-implemented method as recited in claim 1 further including determining the predetermined number of spin cycles using the historical information.

7. An object-based computing environment, the object-based computing environment including an object, the object having an associated locking mechanism, the object-based computing environment comprising:

at least one processor;

a first thread, the first thread being in possession of the locking mechanism; and a current thread, the current thread being arranged to determine when the locking mechanism is possessed by the first thread, the second thread further being arranged to implement a first spinning process when it is determined that the locking mechanism is possessed by the first thread, the first spinning process being arranged such that the current thread spins for up to a predetermined number of spin cycles associated with the current thread and the object, the predetermined number of spin cycles being determined using historical information.

8. An object-based computing environment according to claim 7 wherein the current thread is further arranged to:

determine whether the current thread has obtained possession of the locking mechanism during the first spinning process; and implement a first blocking process when it is determined that the current thread has not obtained possession of the locking mechanism during the first spinning process, wherein during the first blocking process, the current thread is substantially idle while awaiting notification that the locking mechanism is available.

9. An object-based computing environment according to claim 8 wherein the current thread is further arranged to determine when the current thread is in an information gathering position, wherein the first spinning process is implemented when it is determined that the current thread is not in the information gathering position.

10. An object-based computing environment according to claim 9 wherein when it is determined that the current thread is in the information gathering position, the current thread is further arranged to:

implement a second spinning process, the second spinning process being arranged such that the current thread spins for up to a maximum number of spin cycles, the maximum number of spin cycles being specified by the object-based computing environment; and store the historical information associated with the second spinning process, wherein the historical information is used to determine the predetermined number of spin cycles.

11. A computer program product for acquiring ownership of an object in an object-based environment using a current thread, the computer program product comprising:

computer code for determining when the object is owned by another thread;

computer code for locking the object when it is determined that the object is not owned by the another thread;

computer code for implementing a first spinning process when it is determined that the object is owned by the another thread, the first spinning process being arranged such that the current thread spins for up to a predetermined number of spin cycles associated with the current thread and the object, the predetermined number of spin cycles being determined using historical information;

computer code for determining when the object has been locked by the current thread during the first spinning process;

computer code for implementing a first blocking process when it is determined that the object has not been locked by the current thread during the first spinning process, wherein during the first blocking process, the current thread awaits notification that the object is available for locking; and a computer-readable medium that stores the computer codes.

12. A computer program product as recited in claim 11 further including computer code for determining when the current thread is in an information gathering position, wherein the first spinning process is implemented when it is determined that the object is owned by the another thread and the current thread is not in the information gathering position.

13. A computer program product as recited in claim 12 further including:

computer code for implementing a second spinning process, the second spinning process being arranged such that the current thread spins for up to a maximum number of spin cycles, the maximum number of spin cycles being specified by the object-based environment when it is determined that the current thread is in the information gathering position; and computer code for storing the historical information associated with the second spinning process when it is determined that the current thread is in the information gathering position.

14. A computer program product as recited in claim 13 further including:

computer code for determining when the object has been locked by the current thread during the second spinning process; and computer code for implementing a second blocking process when it is determined that the object has not been locked by the current thread during the second spinning process.

15. A computer program product as recited in claim 11 further including computer code for determining the predetermined number of spin cycles using the historical information.

16. A computer program product as recited in claim 11 wherein the computer readable medium is one selected from the group consisting of a computer disk, a hard drive, a tape drive, a CD-ROM, computer memory, and a data signal embodied in a carrier wave.

17. A computer-implemented method for acquiring ownership of an object in an object-based system, the computer-implemented method comprising:

obtaining historical spinning information, the historical spinning information including data associated with a number of times a current thread has previously spun while attempting to acquire ownership of the object;

reducing the historical spinning information to determine a suitable number of spin cycles;

spinning the current thread for up to the suitable number of spin cycles, wherein between spin cycles, the current thread attempts to acquire ownership of the object;

determining when the current thread has acquired ownership of the object; and blocking the current thread when it is determined that the current thread has not acquired ownership of the object.

18. A computer-implemented method as recited in claim 17 wherein the suitable number of spin cycles is associated substantially only with the current thread.

19. A computer-implemented method as recited in claim 17 wherein the suitable number of spin cycles is indicative of a substantially maximum amount the current thread spins to achieve a predetermined level of probability that the current thread acquires ownership of the object during spinning.

20. A computer-implemented method as recited in claim 17 wherein the historical spinning information further includes associated with a number of times at least one additional thread has spun while attempting to acquire ownership of the object.

* * * * *